O. HARP
CRANK HANDLE RETAINING DEVICE.
APPLICATION FILED JULY 12, 1919.
1,344,343. Patented June 22, 1920.
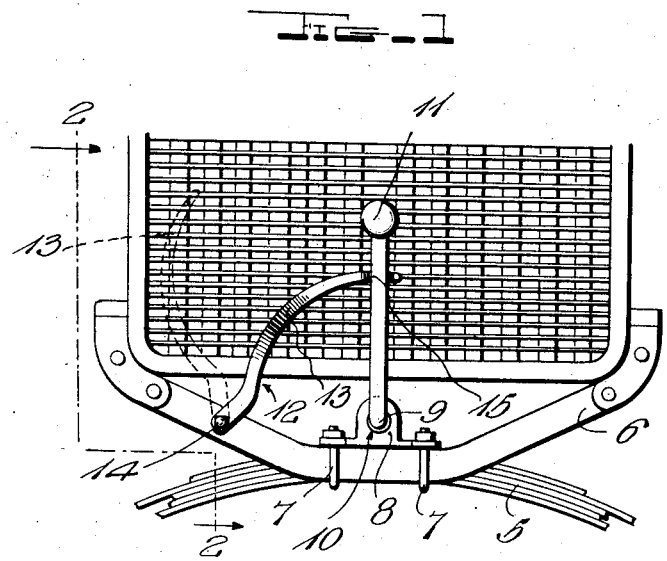
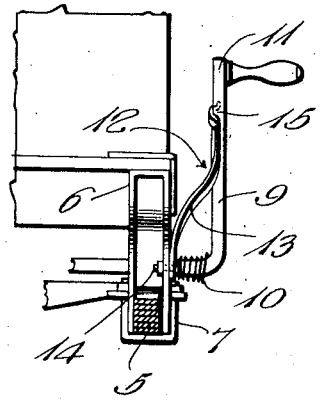
Inventor
Otto Harp
By Norman T. Whitaker
His Attorney

UNITED STATES PATENT OFFICE.

OTTO HARP, OF WADSWORTH, OHIO.

CRANK-HANDLE-RETAINING DEVICE.

1,344,343.   Specification of Letters Patent.   Patented June 22, 1920.

Application filed July 12, 1919. Serial No. 310,325.

*To all whom it may concern:*

Be it known that I, OTTO HARP, a citizen of the United States, and a resident of Wadsworth, in the county of Medina and State of Ohio, have invented new and useful Improvements in Crank-Handle-Retaining Devices, of which the following is a specification.

This invention relates to crank handle retaining devices and has for its primary object the provision of a means for retaining the crank handles of automobiles in an upright or vertical position.

A further object of the invention is to provide a device of the above mentioned character which may be quickly attached to or detached from the automobile with which it is particularly adapted to be associated.

A further object of the invention is to provide a device of the above mentioned character which is strong, durable, simple in construction and cheap to manufacture.

Other objects and advantages of the invention will be apparent during the course of the following description taken in connection with the accompanying drawings.

In the drawings, forming a part of this specification and wherein like numerals are employed to designate like parts throughout the same, Figure 1 is a front elevation of a portion of an automobile having the device embodying my invention attached thereto, Fig. 2 is a vertical sectional view taken substantially on the line 2—2 of Fig. 1, Fig. 3 is a front elevation of the device embodying my invention, and, Fig. 4 is an edge elevation of the same.

In the drawings, wherein for the purpose of illustration is shown a preferred form of my invention the numeral 5 indicates an automobile spring having a portion of the chassis 6 secured thereto by means of suitable connections as shown at 7. The chassis or frame 6 is provided with a suitable journal 8 having mounted therein a crank handle shaft 9 which is normally urged outwardly by means of a coil spring as shown at 10. The crank handle shaft is provided with a crank 11 which is adapted to be retained normally in a vertical or upright position as shown in Figs. 1 and 2 by means of the device embodying my invention, which device is indicated as a whole by the numeral 12 and comprises an arm 13 preferably constructed from resilient metal such as spring steel. The arm 13 is pivotally connected to the frame or chassis by means of a bolt as shown at 14 and is bent relatively near its pivotal connection as shown most clearly in Fig. 4. The arm 13 is bent again relatively near its free end as shown so that the free end may firmly engage the crank handle 11, which crank handle is located an appreciable distance from the vertical plane passed perpendicularly through the bolt 14. The arm 13 is bent at its free end to provide a recess 15 which recess is adapted to receive the crank handle 11 and retain the same normally in a vertical or upright position due to the firm engagement between the arm 13 and the crank handle, the firm engagement being maintained by reason of the resiliency of the spring metal from which the device is constructed.

By pivotally connecting the device to the chassis it is apparent that when it is desired to crank the automobile the arm 13 may be moved to the dotted line position shown in Fig. 1, thereby eliminating any possibility of interference between the crank handle 11 and the device when the automobile is being started.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, what I claim as new and desire to secure and protect by Letters Patent of the United States, is:

The combination with an automobile, of a device for retaining the starting handle of the automobile engine in a vertical position, said device comprising an elongated resilient arm pivotally connected to the chassis of the automobile at the rear of the starting handle and adapted to be swung transversely with respect to the axis of the starting handle to bring the free end of said arm into engagement with the outer end of said starting handle to retain the handle in a vertical position, said arm being bent intermediate its pivotal end and free end to bring the free end in firm engagement with the starting handle when the starting handle is in a vertical position.

OTTO HARP.